(12) United States Patent
Dalluge

(10) Patent No.: US 7,744,062 B2
(45) Date of Patent: Jun. 29, 2010

(54) APPARATUS TO VARY EFFECTIVE SPRING RATE FOR USE IN DIAPHRAGM ACTUATORS

(75) Inventor: Paul Russell Dalluge, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 351 days.

(21) Appl. No.: 11/684,369

(22) Filed: Mar. 9, 2007

(65) Prior Publication Data

US 2008/0217567 A1 Sep. 11, 2008

(51) Int. Cl.
F16K 51/00 (2006.01)
(52) U.S. Cl. .................................. 251/284; 251/337
(58) Field of Classification Search ............... 251/337, 251/61.5, 61.4, 61.2, 284; 267/91, 92, 93, 267/180
See application file for complete search history.

(56) References Cited

U.S. PATENT DOCUMENTS

| | | | | |
|---|---|---|---|---|
| 2,665,711 | A * | 1/1954 | Parks | 251/61.5 |
| 2,671,470 | A | 3/1954 | Boteler | |
| 2,764,996 | A * | 10/1956 | Brown | 251/337 |
| 2,770,252 | A * | 11/1956 | Bass, Sr. | 251/337 |
| 2,872,149 | A | 2/1959 | Battey et al. | |
| 3,253,611 | A * | 5/1966 | Cummins | 251/337 |
| 3,336,942 | A * | 8/1967 | Keith et al. | 267/180 |
| 3,556,504 | A | 1/1971 | Sinclair | |
| 3,938,542 | A * | 2/1976 | Bolha | 251/337 |
| 3,955,595 | A * | 5/1976 | Modes | 251/337 |
| 4,054,156 | A * | 10/1977 | Benson | 251/337 |
| 4,098,487 | A * | 7/1978 | Bauer | 251/61.4 |
| 4,151,979 | A * | 5/1979 | Visalli | 251/337 |
| 4,314,664 | A * | 2/1982 | Wisyanski | 251/337 |
| 4,648,423 | A * | 3/1987 | Henken | 267/180 |
| 4,669,585 | A * | 6/1987 | Harris | 137/599.16 |
| 4,791,956 | A * | 12/1988 | Kominami et al. | 251/337 |
| 4,825,982 | A * | 5/1989 | Yanagawa et al. | 92/130 A |
| 5,392,807 | A * | 2/1995 | Caudle et al. | 251/61.5 |
| 5,431,182 | A | 7/1995 | Brown | |
| 6,042,081 | A | 3/2000 | Anderson | |

(Continued)

FOREIGN PATENT DOCUMENTS

CH 678754 10/1991

(Continued)

OTHER PUBLICATIONS

International Searching Authority, "International Search Report," issued in connection with international application serial No. PCT/US2008/055141, mailed Jul. 2, 2008, 4 pages.

(Continued)

*Primary Examiner*—John Bastianelli
(74) *Attorney, Agent, or Firm*—Hanley, Flight & Zimmerman, LLC

(57) ABSTRACT

Apparatus to vary the effective spring rate of diaphragm actuators are described. An example spring assembly for use in a diaphragm actuator includes a first spring operatively coupled to a diaphragm plate and an actuator stem, and a second spring operatively coupled to the actuator stem and configured to be serially operative with the first spring. Additionally, a movable spring seat is disposed between the first and second springs.

21 Claims, 2 Drawing Sheets

U.S. PATENT DOCUMENTS

| | | | |
|---|---|---|---|
| 6,273,396 B1 * | 8/2001 | Kato | 267/180 |
| 6,371,441 B1 * | 4/2002 | Mattes | 251/337 |
| 6,837,478 B1 * | 1/2005 | Goossens et al. | 251/337 |

FOREIGN PATENT DOCUMENTS

| | | |
|---|---|---|
| EP | 0520928 | 12/1992 |
| EP | 1479542 | 11/2004 |
| GB | 2077393 | 12/1981 |
| GB | 2118329 | 10/1983 |
| JP | 59001827 | 1/1984 |

OTHER PUBLICATIONS

International Searching Authority, "Written Opinion of the International Searching Authority," issued in connection with international application serial No. PCT/US2008/055141, mailed Jul. 2, 2008, 7 pages.

Intenational Bureau, "International Preliminary Report on Patentability," issued in connection with international application serial No. PCT/US2008/055141, issued Sep. 15, 2009, 7 pages.

* cited by examiner

APPARATUS TO VARY EFFECTIVE SPRING RATE FOR USE IN DIAPHRAGM ACTUATORS

FIELD OF THE DISCLOSURE

The present disclosure relates generally to control valve actuators and, more particularly, to apparatus to vary effective spring rate for use in diaphragm actuators.

BACKGROUND

Control valves are used in process control systems to manipulate a flowing fluid, to regulate a process variable to a desired set point, to convey or deliver a fluid from a source to a destination, etc. A control valve assembly typically includes a valve body, a shaft or stem, and an actuator to provide the motive power via the shaft or stem to operate the valve or position a plug or flow control member within the valve. A common type of actuator for use with a control valve assembly is a spring and diaphragm pneumatic actuator, which is commonly referred to as diaphragm actuator.

Typically, diaphragm actuators have a casing to house a diaphragm, a diaphragm plate, an actuator stem, and a spring assembly having one or more springs. The spring assembly applies a force against the diaphragm plate to return the actuator stem and a valve or other operator coupled to the stem to a known position in the absence of a control pressure applied to the diaphragm. In the case where a single spring is used to implement the spring assembly, the spring is typically centrally located on the diaphragm plate. Where multiple springs are used, the springs are typically distributed circumferentially about the center of the diaphragm plate and apply their respective forces directly to the diaphragm plate.

Regardless of whether one or multiple springs are used to implement the spring assembly, diaphragm actuators receive a control pressure to vary gas (e.g., air) pressure on one side of the diaphragm to move or stroke the actuator stem and thereby open and close or modulate a control valve that may be coupled to the actuator stem. The amount of control pressure required to move and maintain the actuator stem and, thus, the valve or other operator controlled by the actuator, at a given position along its range of stroke, typically equals the force exerted by the spring assembly plus the force exerted by the valve or other operator on the actuator stem. The force exerted by the spring assembly typically increases in a substantially proportional and linear manner as the actuator stem moves toward its fully stroked condition.

Additionally, the force exerted against the actuator stem by the valve or other operator may also vary (e.g., increase or decrease) as the position of the valve (e.g., the position of a valve plug, disc, etc.) changes from its zero stroke to its fully stroked condition. Such changes in the force exerted by the valve stem may be due to the flow characteristics of the valve, the pressure and flow rate of the fluid being controlled by the valve, etc. and, thus, may be substantially nonlinear. Thus, the amount of control pressure required to fully stroke the actuator and the valve or other operator coupled to the actuator may be relatively high and, as a result, may require the diaphragm, the casing, and other actuator components to withstand relatively high pressures. Further, because the force exerted by the actuator spring assembly typically varies linearly over the range of the actuator stroke and because the force exerted by the valve on the actuator stem may vary non-linearly or in some other manner, the position of the valve may vary in an undesirable manner relative to control pressure (e.g., substantially non-linearly).

SUMMARY

In one described example, a spring assembly for use in a diaphragm actuator includes a first spring operatively coupled to a diaphragm plate and an actuator stem, and a second spring operatively coupled to the actuator stem and configured to be serially operative with the first spring. The spring assembly includes a spring seat disposed between the first and second springs and configured to move with the second spring.

In another described example, a spring assembly includes a first spring operatively coupled to a movable spring seat and a second spring operatively coupled to the movable spring seat and configured to be serially operative with the first spring.

In yet another described example, a diaphragm actuator includes a first spring operatively coupled to a diaphragm plate and an actuator stem and a second spring operatively coupled to the actuator stem. The diaphragm actuator also includes a movable spring seat disposed between the first and second springs.

DETAILED DESCRIPTION

Example apparatus to vary the effective spring rate for use in a diaphragm actuator are described herein. The example apparatus include a spring assembly having multiple actuator springs that are serially operative to provide a change in the overall or effective spring rate along the stroke of the actuator stem. More specifically, one or more floating or movable spring seats disposed between the springs enables the spring assembly to provide one effective spring rate for a first portion of the actuator stem stroke and another effective spring rate for a second portion of the actuator stem stroke. In particular, the springs and the movable spring seats are configured so that, in operation, for a first distance of movement of the actuator stem, a force provided by one of the springs changes, the movable spring seats do not move, and a force provided by the other springs is substantially constant. Then, for a second distance of movement of the actuator stem in addition to the first distance, the force exerted by at least one of the others springs varies as one or more of the movable spring seats moves.

In this manner, the example spring assemblies described herein enable the thrust provided by a diaphragm actuator to be selected for improved performance or optimized at, for example, both the beginning or top and the end or bottom of its stroke. In other words, in contrast to many known diaphragm actuators, which typically have a single effective spring rate, one effective spring rate can be selected for operation at one end of the stroke and another effective spring rate can be selected for operation at the other end of the stroke to better suit the needs of the application. For example, in some applications it may be desirable to have a relatively high spring rate at the beginning of the actuator stroke to ensure that the actuator provides sufficient force to achieve a tight shut off (e.g., in the absence of a control pressure) of a valve coupled to the actuator. However, at the other end of the actuator stroke it may be desirable to have a relatively lower spring rate to reduce the amount of control pressure needed to fully stroke the actuator and the valve coupled thereto.

Figure 1:
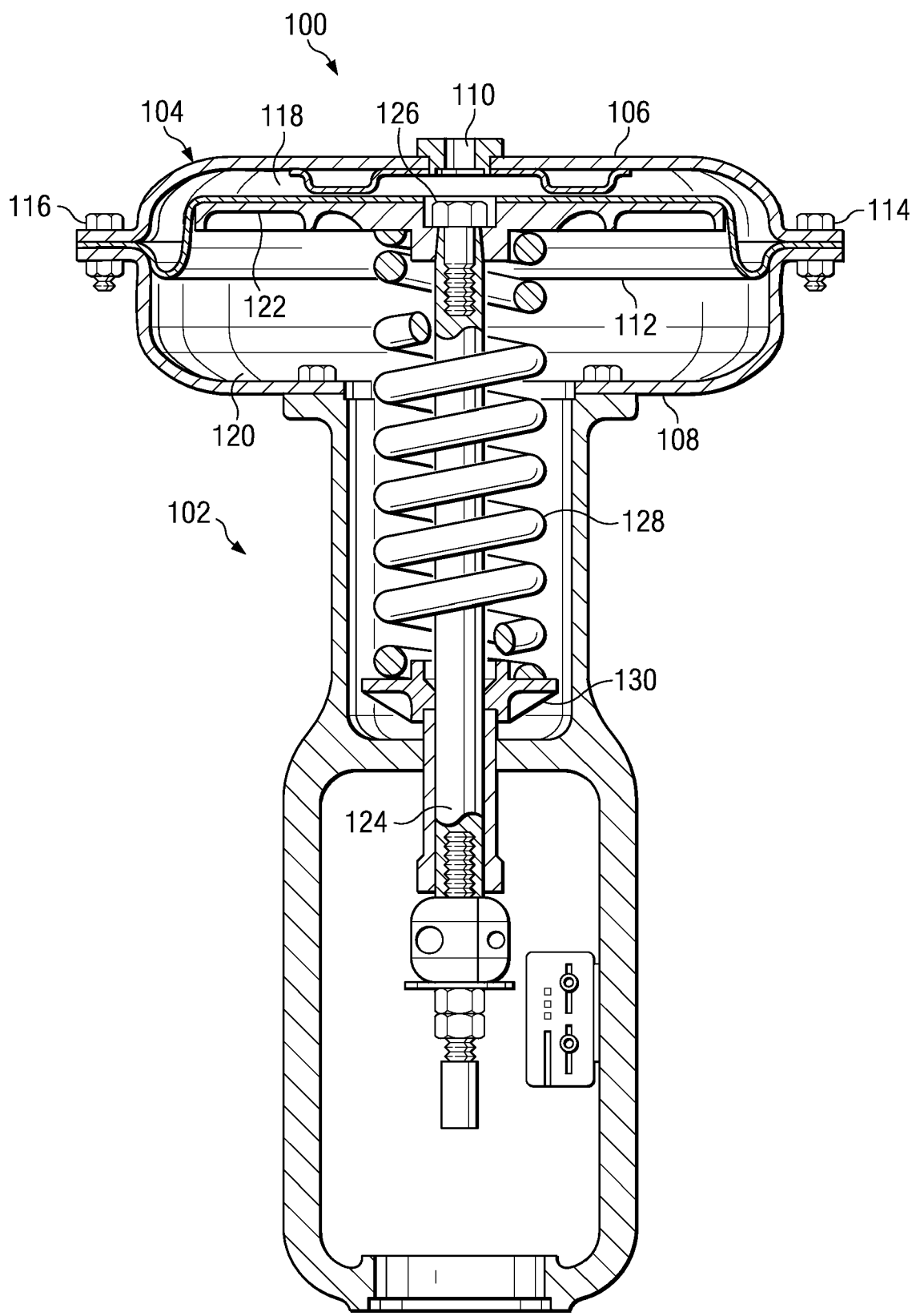
FIG. 1 is a cross-sectional view of a known diaphragm actuator.

Before describing the example apparatus to vary the effective spring rate or constant of a spring assembly used in a diaphragm actuator, a brief description of a known diaphragm actuator is provided in connection with FIG. 1. FIG. 1 depicts a cross-sectional view of a known diaphragm actuator 100. The diaphragm actuator 100 includes an actuator body or yoke 102 coupled to a casing 104. The casing 104 includes an upper casing 106 and a lower casing 108. In addition, the upper casing 106 is configured with a control pressure port 110. The control pressure port 110 includes an inlet to receive a control pressure signal to vary a pressure inside the diaphragm casing 104. Conversely, the lower casing 108 maintains a substantially atmospheric pressure via a port or vent, not shown in FIG. 1.

The casing 104 captures a diaphragm 112 between the upper and lower casings 106 and 108, which are coupled together with a plurality of threaded fasteners 114 and 116 spaced along an outer edge of the casing 104. The diaphragm 112 separates the space within the casing 104 into a control pressure chamber 118 and an atmospheric pressure chamber 120. In addition, at least a portion of one side of the diaphragm 112 is secured to a diaphragm plate 122, which provides a rigid backing for the diaphragm 112 and is configured to engage an actuator stem 124. The actuator stem 124 may also be referred to as a cylindrical member, a rod, a shaft, etc. As depicted in FIG. 1, the actuator stem 124 is a cylindrical member that connects the diaphragm actuator 100 to a valve plug stem (not shown) and which transmits force and linear motion from the diaphragm actuator 100 to a control valve (not shown). The diaphragm 112 and the diaphragm plate 122 are coupled to the actuator stem 124 via a threaded fastener 126, which may be a threaded bolt as shown.

An actuator spring 128 surrounding the actuator stem 124 is centrally disposed on the diaphragm plate 122 and positioned between the diaphragm plate 122 and a fixed spring seat 130. The actuator spring 128 provides a bias force to urge the diaphragm plate 122 and, thus, the actuator stem 124 toward the upper casing 106. In operation, a control pressure applied to the control pressure port 110 varies a pressure in the control chamber 118. For example, as the pressure in the control chamber 118 increases above atmospheric pressure (i.e., the pressure in the chamber 120), the diaphragm 112, the plate 122, and the stem 124 are urged toward the lower casing 108 against the return force of the actuator spring 128. When the force exerted on the diaphragm 122 by the control pressure exceeds any pre-load or bias exerted by the spring 128 at the zero stroke position of the actuator 100 plus any load applied to the stem (e.g., via a valve or other operator coupled to the actuator stem 124), the diaphragm 112, the plate 122, and the stem 124 move downward or away from the upper casing 106. As the diaphragm 112, the plate 122 and the stem 124 move away from the upper casing 106, the spring 128 is compressed and the return force exerted by the spring 128 increases in a substantially proportional and linear manner relative to the position of the stem 124. The manner in which the return force exerted by the spring 128 changes with movement of stem 124 can generally be described using Hooke's Law as set forth below in Equation 1.

$$F = -kx \quad (1)$$

In Equation 1, F is the restoring force exerted by a spring, k is the spring constant of the spring, and x is the change in the length of the spring relative to its free length. The negative sign indicates that the force exerted by the spring 128 is in direct opposition to the movement of the stem 124. Thus, with the known diaphragm actuator 100 of FIG. 1, the effective spring rate (i.e., k) is constant over the entire stroke of the actuator 100.

Figure 2:
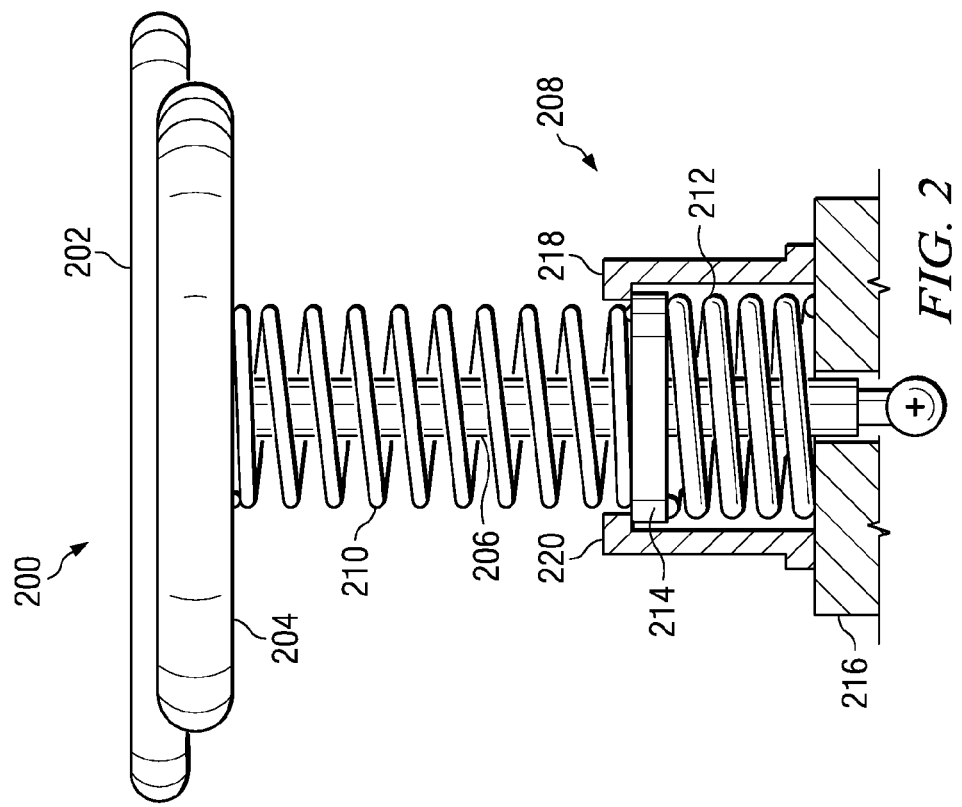
FIG. 2 is a cross-sectional view of a portion of an example diaphragm actuator with a spring assembly having a movable spring seat disposed between two springs.

FIG. 2 depicts a cross-sectional view of a portion of an example diaphragm actuator 200 that includes apparatus to vary the effective spring rate of the actuator 200 over its stroke. For clarity, certain components (e.g., a casing) are not shown in FIG. 2. However, those components which are not shown in FIG. 2 may be implemented using known actuator components such as those depicted in FIG. 1.

Now turning in detail to FIG. 2, the example diaphragm actuator 200 includes a diaphragm 202, a diaphragm plate 204, an actuator stem 206, and a spring assembly 208. The spring assembly 208 includes a first spring 210 and a second spring 212 arranged in a serial configuration surrounding the stem 206 and coaxially aligned with a central axis of the diaphragm actuator 200.

A floating or movable spring seat 214 is disposed between the springs 210 and 212. The second spring 212 is partially compressed to provide a pre-load force and is captured between the movable spring seat 214 and a fixed or stationary spring seat 216. A stop 218, 220 limits the movement of the movable spring seat 214 toward the diaphragm plate 204 and, thus, enables the second spring 212 to provide a desired pre-load force. As shown in FIG. 2, the stop 218, 220 may be implemented as a single component or as two or more separate components spaced circumferentially about the movable spring seat 214. For example, the stop 218, 220 may be configured as a cylindrical body having a central aperture, and positioned between the first spring 210 and a surface of the movable spring seat 214, thereby housing the movable spring seat 214 and the second spring 212.

As can be seen from the example in FIG. 2, the first spring 210 is operatively coupled to the diaphragm plate 204 and the actuator stem 206, and the second spring 212 is operatively coupled to the actuator stem 206 and configured to be serially operative with the first spring 210. More specifically, at the beginning of the stroke of the actuator 200, the first spring 210 is displaced or compressed while the pre-load of the second spring 212 prevents the movable spring seat 214 from moving away from contact with the stop 218, 220. Thus, for a first distance of movement or displacement of the first spring 210 and the stem 206, the force exerted by the first spring 210 increases in proportion to the change in length of the spring 210 and its spring constant. However, while the force exerted by the first spring 210 is less than the pre-load force exerted by the second spring 212, the movable spring seat 214 and the second spring 212 remain stationary, and the force exerted by the second spring 212 remains substantially constant and in opposition to the force exerted by the first spring 210.

When the first spring 210 is sufficiently compressed (i.e., the actuator stem 206 has moved a certain distance along its stroke), the force exerted by the first spring 210 equals the pre-load force of the second spring 212. Further compression of the first spring 210 (or movement of the stem 206) results in a force exerted by the spring 210 that exceeds the pre-load force of the spring 212 and, thus, causes the movable spring seat 214 to move with the second spring 212 as the second spring 212 is compressed. As a result, movements of the actuator stem 206 that correspond to compressions or displacements of the first spring 210 that exert a force exceeding the pre-load force of the second spring 212 cause both the first spring 210 and the second spring 212 to move or compress. Thus, for these movements or over a certain distance of movement along the stroke of the actuator, the forces exerted by the first spring 210 and the second spring 212 vary and the total force exerted by the spring assembly 208 is based on a sum of the forces exerted by both of the springs 210 and 212. As a result, the overall or effective spring constant is based on the individual spring constants of the first spring 210 and the second spring 212 as set forth in greater detail below.

For a spring assembly containing serially operative actuator springs, the effective spring rate of the spring assembly when all of the springs are displaced simultaneously can be generalized as shown in Equation 2 below.

$$k_T = \frac{1}{\left(\frac{1}{k_1} + \frac{1}{k_2} + \frac{1}{k_3}...\right)} \quad (2)$$

where $k_T$ is the total effective spring constant and $k_1$, $k_2$, and $k_3$ are the spring constants of the individual springs. Simplifying Equation 2 for two springs in series results in Equation 3 below.

$$k_T = \frac{k_1 k_2}{(k_1 + k_2)} \quad (3)$$

As can be shown using Equation 3, if two serially operative springs have the same spring constant, for example, the total effective spring rate of the spring assembly decreases to half that of the individual springs when both springs are being displaced simultaneously.

Returning to the example diaphragm actuator 200 of FIG. 2, if the spring constant of the first spring 210 is $k_1$ and the spring constant of the second spring 212 is $k_2$, then for a first distance of movement of the actuator stem 206 (e.g., where the force exerted by the first spring 210 is less than the pre-load force exerted by the second spring 212) the effective spring rate of the spring assembly 208 is $k_1$. Then, for a second distance of movement of the actuator stem 206 (e.g., where the force exerted by the first spring 210 is greater than the pre-load force generated by the second spring 212), the effective spring rate of the spring assembly 208 is $k_T$ as set forth in Equation 3 above. Thus, the springs 210 and 212 are serially operative to provide two different effective spring rates for different portions of the stroke of the actuator 200.

While the springs 210 and 212 in the example spring assembly 208 of FIG. 2 are depicted as compression springs, other types and/or combinations of springs could be used in a similar manner to provide a variable effective spring rate over the displacement of the spring assembly 208. For example, extension springs, wave springs, Belleville springs, etc. could be arranged in a serially operative configuration with a movable spring seat to achieve similar results. Further, the spring constants of the springs 210 and 212 can be selected individually to provide a desired change in the effective spring rate of the spring assembly 208 over the displacement of the springs 210 and 212 and, thus, over the stroke of the actuator 200. Thus, the spring constants for the springs 210 and 212 may be the same or different depending on the needs of the intended application of the example actuator 200.

Figure 3:
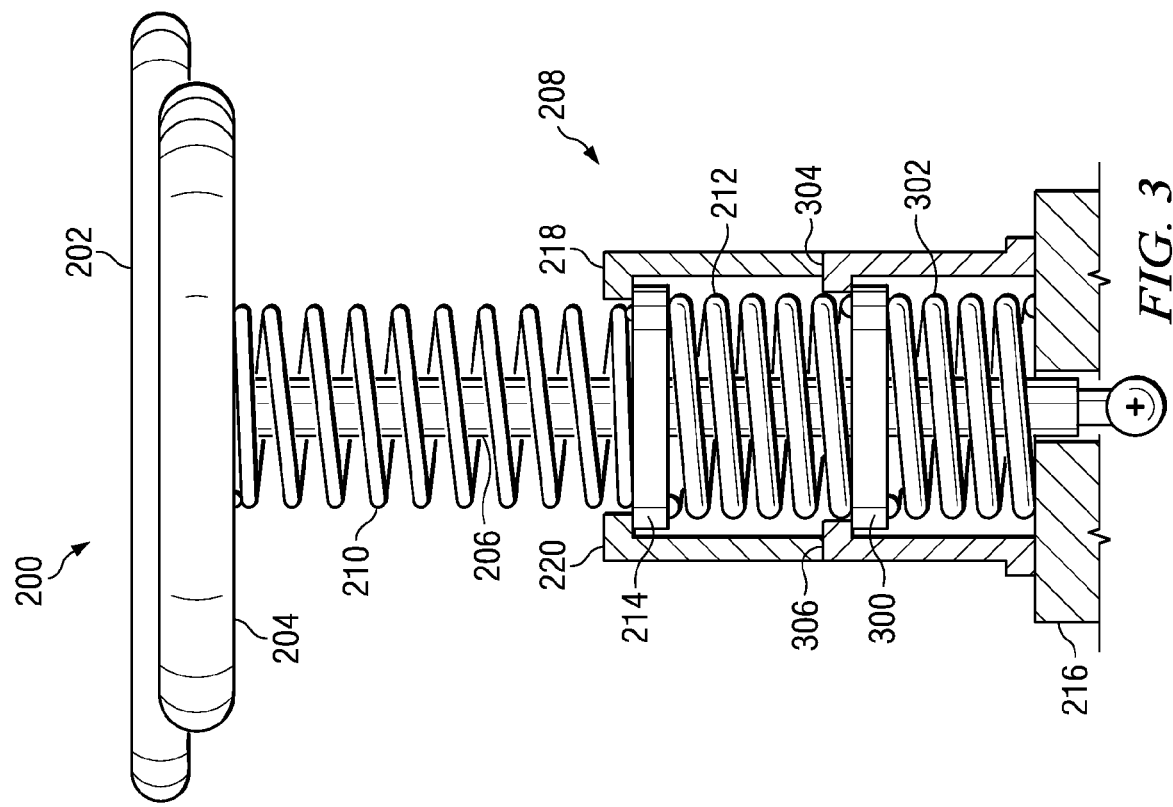
FIG. 3 is an enlarged cross-sectional view depicting an alternative spring assembly that by be used in a diaphragm actuator.

FIG. 3 is an enlarged cross-sectional view depicting an alternative spring arrangement of the example spring assembly 208 of FIG. 2. In the alternative arrangement of FIG. 3, a second movable spring seat 300 engages the second actuator spring 212 and a third spring 302. The alternative arrangement also includes a second mechanical stop 304, 306 configured to limit the movement of the third actuator spring 302 and the second movable spring seat 300.

The three spring arrangement depicted in FIG. 3 operates similarly to the spring assembly 208 of FIG. 2. However, the arrangement depicted in FIG. 3 provides three effective spring rates over the stroke of the actuator stem 206. The third effective spring rate is provided when the total force exerted by the first spring 210 and the second spring 212 exceeds the pre-load force exerted by the third spring 302. Again with reference to Equation 2 above, the effective spring rate of three springs simultaneously being displaced can be expressed as shown below in Equation 4.

$$k_T = \frac{k_1 k_2 k_3}{(k_2 k_3 + k_1 k_3 + k_1 k_2)} \quad (4)$$

Thus, as shown from Equation 4, the effective spring rate of the spring assembly of FIG. 3 can be further reduced for a third portion of the stroke of the actuator stem 206. In other, words the arrangement of FIG. 3 provides three different effective spring rates along the stroke of the actuator stem 206. Specifically, the effective spring rate of the arrangement shown in FIG. 3 decreases twice from its initial effective spring rate as the actuator is stroked from its zero stroke condition to its fully stroked condition. Thus, the additional series spring 302 decreases the total effective spring rate to one third (e.g., if $k_1=k_2=k_3=1$, then $k_T=\frac{1}{3}$).

Although certain example apparatus have been described herein, the scope of coverage of this patent is not limited thereto. On the contrary, this patent covers all apparatus and articles of manufacture fairly falling within the scope of the appended claims either literally or under the doctrine of equivalents.

What is claimed is:

1. A spring assembly for use in a diaphragm actuator, comprising:
    a first spring operatively coupled to a diaphragm plate, a diaphragm and an actuator stem;
    a second spring operatively coupled to the actuator stem and configured to be serially operative with the first spring; and
    a spring seat disposed between the first and second springs and configured to move with the second spring, wherein the first and second springs are configured so that for a first distance of movement of the actuator stem, a force provided by the first spring changes in proportion to a change in length of the first spring and a force provided by the second spring is substantially constant and opposes the force provided by the first spring while the second spring remains stationary.

2. The spring assembly as defined in claim 1, wherein the first and second springs have different respective spring constants.

3. The spring assembly as defined in claim 1, wherein the first and second springs are configured so that for a second distance of movement of the actuator stem in addition to the first distance the force exerted by the second spring varies and a total force exerted on the diaphragm plate is based on the force exerted by the second spring plus the force exerted by the first spring.

4. The spring assembly as defined in claim 1, wherein the second spring is configured to provide a preload.

5. The spring assembly as defined in claim 1, wherein the first and second springs are configured to be serially operative so that for a first distance of movement of the actuator stem the first and second springs provide a first effective spring rate, and for a second distance of movement of the actuator stem the first and second springs provide a second effective spring rate.

6. The spring assembly as defined in claim 1, further comprising a mechanical stop to limit a range of movement of the movable spring seat.

7. The spring assembly as defined in claim 1, further comprising a third spring configured to be operatively engaged to the actuator stem and to be serially operative with the first and second springs, and a second spring seat disposed between the second and third springs and configured to move with the third spring.

8. The spring assembly as defined in claim 1, wherein each of the first and second springs comprises a compression spring.

9. A spring assembly for use with a diaphragm actuator, comprising:
   a diaphragm coupled to an actuator stem;
   a first spring operatively coupled to a movable spring seat and the actuator stem; and
   a second spring operatively coupled to the movable spring seat and configured to be serially operative with the first spring so that for a first distance of movement of the first spring, a force provided by the first spring changes in proportion to a change in length of the first spring and a force provided by the second spring is substantially constant and opposes the force provided by the first spring while the second spring remains stationary.

10. The spring assembly as defined in claim 9, wherein the first spring and the second spring have different respective spring constants.

11. The spring assembly as defined in claim 9, wherein the first and second springs are configured so that for a second distance of movement in addition to the first distance the force provided by the second spring varies.

12. The spring assembly as defined in claim 9, wherein the movable spring seat is between the first and second springs.

13. The spring assembly as defined in claim 9, further comprising a mechanical stop to limit a range of motion of the movable spring seat.

14. A diaphragm actuator comprising:
   a first spring operatively coupled to a diaphragm and an actuator stem;
   a second spring operatively coupled the actuator stem such that for a first distance of movement of the actuator stem, a force provided by the first spring changes in proportion to a change in length of the first spring and a force provided by the second spring is substantially constant and opposes the force provided by the first spring while the second spring remains stationary; and
   a movable spring seat disposed between the first and second springs.

15. The diaphragm actuator as defined in claim 14, wherein the first and second springs are configured to be serially operative so that for a first distance of movement of the actuator stem the first and second springs provide a first effective spring rate and for a second distance of movement of the actuator stem the first and second springs provide a second effective spring rate.

16. The diaphragm actuator as defined in claim 14, wherein the first and second springs are configured to provide a first spring rate for one portion of a stroke of the diaphragm actuator and a second spring rate lower than the first spring rate for another portion of the stroke of the diaphragm actuator.

17. The diaphragm actuator as defined in claim 14, wherein the first and second springs comprise compression springs.

18. The diaphragm actuator as defined in claim 14, further comprising a mechanical stop to limit a range of motion of the movable spring seat such that the second spring provides a preload force to the first spring when the movable spring seat is in engagement with the mechanical stop.

19. The diaphragm actuator as defined in claim 18, wherein the mechanical stop comprises a housing to receive the second spring and the movable spring seat, and wherein a portion of the housing includes tabs that engage the movable spring seat to limit the range of motion of the movable spring seat.

20. The spring assembly of claim 1, wherein the second spring and the spring seat remain substantially stationary relative to the first spring when a force exerted by the diaphragm actuator in the first direction on the first spring is less than or equal to a preload force provided by the second spring, and wherein the second spring and the spring seat move with the first spring when a force exerted by the diaphragm actuator in a first direction on the first spring is greater than the preload force provided by the second spring.

21. The spring assembly of claim 9, wherein a movement of the movable spring seat in a first direction toward the first spring is limited to enable the second spring to provide a preload force so that a force exerted by the first spring that is greater than the preload force will cause the movable spring seat and the second spring to move in a second direction opposite the first direction, and a force exerted by the first spring that is less than or equal to the preload force provided by the second spring will cause the movable spring seat and the second spring to remain substantially stationary relative to the first spring.

* * * * *